(12) United States Patent
Smith

(10) Patent No.: US 6,460,024 B1
(45) Date of Patent: Oct. 1, 2002

(54) DATA-DOMAIN SAMPLED NETWORK

(75) Inventor: Jay L. Smith, Ogden, UT (US)

(73) Assignee: Weber State University, Ogden, UT (US)

( * ) Notice: Subject to any disclaimer, the term of this patent is extended or adjusted under 35 U.S.C. 154(b) by 0 days.

(21) Appl. No.: 09/398,519

(22) Filed: Sep. 15, 1999

Related U.S. Application Data

(60) Provisional application No. 60/100,925, filed on Sep. 17, 1998.

(51) Int. Cl.[7] .................................................. G06N 3/02
(52) U.S. Cl. ............................ 706/26; 367/49; 181/122
(58) Field of Search ........................... 706/26; 181/122; 367/49

(56) References Cited

U.S. PATENT DOCUMENTS 5,231,252 A  *  7/1993  Sansone ...................... 181/122
5,335,208 A  *  8/1994  Sansone ....................... 367/49

OTHER PUBLICATIONS

Dzielinski, A. et al., N–D Nonuniform Sampling Approach to Neurocontrol: A Guided Tour, UKACC International Conference on Control '96, Sep. 2–5, 1996, Publication No. 427, pp. 987–992, 1996.*

Dzielinski, A., "An Algorithm for Nonlinear Systems Modelling Based on N–D Function Reconstruction", Source unknown, pp. 12/1–5, 1996.

Dzielinski, A., et al., "N–D NonUniform Sampling Approach to Neurocontrol: A Guided Tour", UKACC International Conference on Control '96, Sep. 2–5, 1996, Publication No. 427, pp. 987–992, 1996.

Dzielinski, A., et al., "Multidimensional Sampling Aspects of Neurocontrol With FeedForward Networks", Artificial Neural Networks', Jun. 26–28, 1995, Conference Publication No. 409, pp. 240–44, 1995.

* cited by examiner

Primary Examiner—Wilbert L. Starks, Jr.
(74) Attorney, Agent, or Firm—Madson & Metcalf

(57) ABSTRACT

An apparatus (10) may implement a method (160) for creating (162) a data-domain sampled network (206). In certain embodiments, a method in accordance with the invention may define (166) a data domain, provide (172) points in a data-domain space or sub-space, followed by analyzing (174) data in the data domain (100). Analysis (174) may involve selecting (175) the dimensions or variables of interest, evaluating (176) or determining (176) the cycles per dynamic range, selecting (177) an interpolation method, and selecting (178) a number of sample points (223) in each respective dimension (227, 228). Providing (180) a data-domain network (206) typically includes applying (184) sampling theory to a native data domain (100). Calculating (188) waits for this by an interpolation module (212) specifies the data-domain network in its native domain (100).

20 Claims, 9 Drawing Sheets

DATA-DOMAIN SAMPLED NETWORK

Related Applications

This application is a continuation-in-part of a co-pending U.S. provisional patent application, Ser. No. 60/100,925, filed on Sep. 17, 1998 and directed to a Data-Domain Sampled Network.

BACKGROUND

1. The Field of the Invention

This invention relates to data analysis, and more particularly, to novel systems and methods for mapping correlations of data while maintaining data in an original data-domain rather than transforming the data into other domains for manipulation.

2. The Background Art

In the disclosure of U.S. Pat. No. 5,796,922 issued Aug. 18, 1998 to Smith and directed to a Trainable, State-Sampled, Network Controller, several very useful analysis techniques are presented. In addition to the matrix algebra methodologies, very useful properties in a state-sampled domain are relied upon. For example, by reliance upon the uncoupled, independent nature of variables in the state domain, simplified systems of equations may be formulated and readily solved. However, if data is highly coupled, the presumption of independence or uncoupling between variables is highly inaccurate.

Also, the '922 patent relies on transformations into, and subsequent analysis in, the state-space domain. Such transformations into a state-space typically provide analytical simplicity. However, in many actual situations encountered, information regarding coupling between dimensions is lost by the required transformations.

Another issue raised when one reviews the '922 patent is that of "previous knowledge" of the form of equations. In control systems, classical control theory provides a plethora of terms having forms well understood for modeling various configurations of hardware or other control environments. In other classes of problems encountered in the real world, the forms of equations are not necessarily known. Moreover, in many situations, even when the form of equations is known, or the equations themselves are exactly known, absolutely intractable calculation complexity prohibits actual solutions of the governing equations.

Thus, what is needed is a method that does not require independence of variables, but which can rather accommodate, even capture and interpret, the coupled relationships between different variables (dimensions) in a data-domain. Also needed is a method that does not require transforms, particularly transforms that may lose information from the original data-domain. Another need is the need for a simplified, virtually single-step, method for mapping an output or solution surface in a multidimensional data space from the data directly without having to undergo complex calculations, encounter impossible calculations, or know a priori the form of a governing equation.

Linear networks use a linear set of simultaneous equations having variables (parameters of influence) which may include outputs and inputs. Each variable in an equation has a leading coefficient associated with it to scale the contribution of the variable to the equation. A linear system solver or other matrix system solver may be used to solve a system of resulting equations, defining the coefficients.

In general, linear algebra is a well understood art. Moreover, nonlinear systems of equations are also tractable by both closed form solutions and by various numerical methods.

The '922 patent discusses at length the mathematical support for network-type controllers. Moreover, the patent discusses and compares network and classical controllers. The patent describes a controller that does not require complete knowledge of the system controlled, but relies instead upon an understanding of the form of various control parameters in control equation. The method then can identify the coefficients that best suit the various terms to formulate a control equation.

Data is originally obtained in a native domain. For example, time is measured in time. Space is measured in distance. Temperature is measured in a Fahrenheit, Celsius, Kelvin, or other temperature domain. Electromagnetic radiation is measured in a particular spectral domain.

All data is composed of numbers and "units" or "domain identifiers." That is, numbers do not stand alone. A number represents a quantity of something in a domain. Thus, a time domain may be incremented in seconds, minutes, hours, days, weeks, years, centuries, millennia, and so forth. Angles may be measured in degrees, seconds, minutes, radians, or the like. Similarly, distances may be measured in rectangular or polar coordinates. Velocities may be measured in angular or polar coordinates involving both spatial dimensions and temporal dimensions.

When data is converted or transformed from its original domain into another domain for purposes of mathematical manipulation, the motivation is usually some desire for simplicity. For example, certain problems arising in a polar coordinate domain may be very easily tractable in a rectangular coordinate domain. Similarly, certain equations or data that appears complex in a rectangular spatial domain may be readily tractable in a polar spatial coordinate domain.

Similarly, certain domains may represent mathematical functions. Since mathematical functions may be comparatively simple or complex, analysts may prefer to transform data from one domain, in which the data appears governed by comparatively complex equations or variables, into an alternative domain, where the data appears to be controlled by comparatively simple expressions or equations.

For example, one set of transformations that is frequently used is the set of transformations available to convert polar coordinates to rectangular coordinates, and vice versa. Trigonometry provides numerous relationships between spatial coordinates in rectangular and polar systems. Here however, a great difficulty often interferes.

Data obtained from observation of actual physical systems is usually continuous in its original data-domain, well behaved, of finite scope, and is described in comparatively simple mathematical terms. However, in order to avoid certain non-linear relationships, data from an original data-domain may be mapped to some other domain for analysis, manipulation, presentation, or the like. When trigonometric functions are used to transform data from a data-domain to some other analytical domain, problems arise in the inherent discontinuities that exist in trigonometric functions.

A classic example is the inverse tangent function. This function takes on values approaching infinity at certain asymptotes. Computationally, computers cannot tolerate infinite numbers nor divisions by zero. Thus, obtaining inverses of transformations is impossible at certain locations.

In one example, angular data from a two-axis magnetometer may be used to measure the rotational angle and rotational velocity of a spinning platform. A magnetometer measures magnetic field in two orthogonal, cartesian coordinates x and y. The two components of the magnetic field may be more easily relied upon if converted to angular directions and angular velocities. An arctangent relying of the orthogonal components of the magnetic field may thus yield an angle in degrees or radians, and an angular velocity in degrees per second or radians per second. Unfortunately, a discontinuity occurs at positive or negative 180 degrees. Thus, a system relying on the foregoing transformation is useless at angles approaching 180 degrees. Derivative data, such as a time derivative of position, yielding velocity, is even more problematic. A rotational velocity is a continuous function at all angles. However, magnetometer data in two cartesian directions contains all of the information, but the transformation again has discontinuities at the asymptotes of the arctangent.

Thus, various processes of converting data especially coupled into a domain different from the native or data domain may corrupt or lose some of the information. Often the information is lost by creation of discontinuities in what should be, or originally was, continuous data. For example, in the above-referenced example of the magnetometer, the important information is a non-linear relationship of phase between the two data channels. A data-domain sampled network is needed that can be used to optimally map multidimensional input data, each input remaining in the domain best suited to the specific data. Likewise, outputs really ought to be expressed in terms of variables in a domain best suited for the outputs.

Thus, what is needed is a system for simply and rapidly correlating outputs and inputs related to data, in their original domains, without requiring an intermediate transformation. In classical methods, this is often impossible. Complexity may render problems intractable. Numerical methods, in which computerized algorithms for approximation are sufficiently accurate, or can be made sufficiently accurate for all practical purposes, are desirable. Thus, what is needed is a method by which data can be maintained in its original domains, and in which some correlation between data parameter of interest (e.g. inputs and outputs, or independent variables and dependent variables) can be related quickly, accurately, continuously, and simply.

BRIEF SUMMARY AND OBJECTS OF THE INVENTION

In view of the foregoing, it is a primary object of the present invention to provide a method and apparatus for moving between dimensions of a data-domain, e.g. to correlate inputs and outputs and outputs in a solution space without losing information from the data-domain through transformations.

It is an object of the invention to provide a method and apparatus effective to amalgamate multidimensional data, combining data sets or streams without requiring or falsely assuming independence or uncoupling between variables (dimensions in the data-domain).

It is an object of the invention to provide a method and apparatus for Preserving information in data interdependent variables from different dimensions in the data-domain.

It is an object of the invention to provide simplified data processing, analysis, and the like wherein data may be correlated to provide useful relationships (e.g. solutions, input/output relations) in a single algorithmic operation, particularly without loss of continuity of any dimension of the data-domain.

It is an object of the invention to do the foregoing without requiring a priori knowledge of the equations or forms of equations relating variables to one another.

Consistent with the foregoing objects, and in accordance with the invention as embodied and broadly described herein, an apparatus and method are disclosed, in suitable detail to enable one of ordinary skill in the art to make and use the invention. In certain embodiments of methods and apparatus in accordance with the invention, data may be manipulated or used in a data network of data points (as opposed to a hardware computer network, over which operations may proceed) in an original data-domain, without transformation into a domain that would lose important properties of the data. For example, continuity of functions or derivatives of functions may be maintained.

In certain embodiments of an apparatus and method in accordance with the invention, correlations may be made between a data input domain and a data output or solution domain, or between an independent variable domain and a dependent variable domain. Interpolation functions may be selected for fitting or optimally fitting the curvature of a surface in a functional domain dependent on a data-domain. Values of a function in a functional domain (e.g. dependent variables in a dependent variable domain), corresponding to selected points in a multidimensional data-domain, may be saved in memory. All points intermediate the saved points may be interpolated comparatively rapidly and accurately by interpolating with the interpolation functions. Interpolation functions may be comprised of linear combinations of terms. The terms may be linear or non-linear combinations of variables in the data-domain and weighting coefficients for correlating variables to the functional values.

One may say that the network of data points in a data-domain represents a sample. The sample may be taken at regular or irregular intervals over each dimension of a data-domain, as may best serve the purpose of a user. A value of a function in a functional sub-space (e.g. solution space, functional range, etc.) dependent upon other variables in a data-domain sub-space may be obtained with a minimum of computational complexity. In many embodiments, interpolation functions may be optimized using the data points in data-domain in order to provide optimized interpolations and nearly identical calculation times for every interpolation, based on an optimized sample size and interpolation function, correlating the function range to the data-domain.

In certain embodiments an apparatus and method in accordance with the present invention may include a general purpose digital computer, which may be networked in a local area network with other computers. Likewise a computer may be linked over an internetwork of smaller networks to any extent manageable.

To avoid confusion, one should differentiate between a hardware network of various items of apparatus (e.g. interconnected computers, devices) and a data network (a correlation of a grid of points in a data space of some dimension), A computer, in one embodiment of a method and apparatus in accordance with the invention, may process information provided directly to it by peripheral devices, or may receive data from other computers over one or more networks. Similarly, a computer may process data and send results to one or more computers or computationally capable devices over one or more networks.

In accordance with certain aspects of the invention, a memory of a computer may contain executable data (executables, programs, applications, instructions) and non-executable data (operational data). The processor of a computer may be loaded or programmed with executables for processing operational data, thus becoming a special purpose digital computer programmed to perform the functions enabled by the executables.

Methods in accordance with the invention may be executed on a computer or several computers together. Some methods may involve interaction between one or more computers and a user. Other methods may involve interaction between peripheral devices (e.g. data sensors, other data sources, machines, or other data consuming apparatus) and computers, between computers, users, and devices, between different computers, or between components of a single computer.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
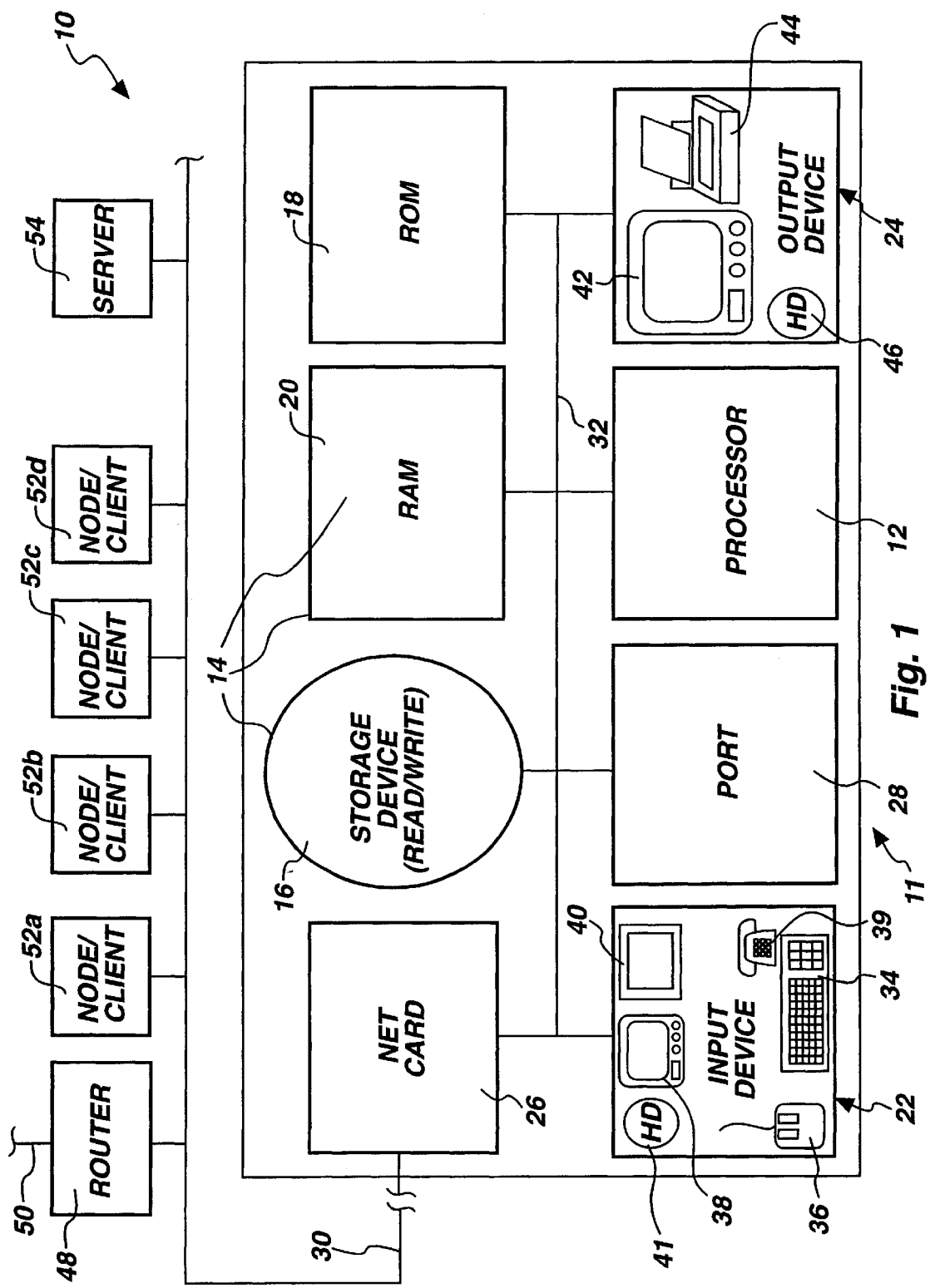
FIG. 1 is a schematic block diagram of an apparatus in accordance with the invention suitable for operating within a computer system over networks.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

In general, it is desirable to provide interpolation functions and appropriate weights spanning an entire range or domain of interest. In systems in accordance with the invention, unlike prior art systems, matrix equations may be non-linear, and need not be uncoupled or independent. In prior art systems, such as that disclosed in U.S. Pat. No. 5, 796,922, an understanding of the dynamic models and the typical controllers was required. Moreover, the knowledge of dynamic models and controllers provided the mathematical basis for transformations. Thus, reliable transforms were available. If no understanding of a dynamic model or of the form of an equation is available, or required, then transforms are unknown.

By contrast, in an apparatus and method in accordance with the invention, knowledge only of the structure of data is required. Knowledge only of the data and the structure of data (e.g. readily observable characteristics such as values and derivatives etc.) is relied upon for analysis under sampling theory. Moreover, transforms are neither required nor available. Instead, the data is managed, taken, and manipulated strictly in its own domain without the use of transforms. In presently preferred methods and apparatus in accordance with the invention, data is stored in a data-domain and not a transformed domain. The relationships stored in the data are saved rather than being changed or lost by transforms or transformations. In general, methods and apparatus in accordance with the invention do not require prior knowledge of the analytical relationship between data points, or the relationship between variables in the data-domain space.

Also, in the prior art, such as in state-sampled domains disclosed in the '922 patent, information was stored in a state domain. States are assumed, necessarily, to be virtually independent (uncoupled). Although some slight dependence may be permissible, it is ignored if present, and must be substantially less significant than the relationships of interest. Thus, in state-sampled domains, the individual states, and the individual dimensions of the state space are basically uncoupled.

By contrast, in an apparatus and method in accordance with the invention, influence and coupling between data variables (dimensions in a data-domain) is significant, and is saved in the data, and in the data-domain sampled network. Variables may correlate strongly between dimensions in a data-domain. The relationships are maintained by manipulating and storing the data in the data-domain, rather than in a transformed domain. Thus, information that is present in the correlations between variables (dimensions) in a data-domain, is saved and relied upon in analysis and interpolation of the data corresponding to a sampled network in use.

In general, the matrix algebra provided in the prior art, and explained quite thoroughly in U.S. Pat. No. 5,796,922 may be relied upon. However, beyond the basics of linear and non-linear matrix analysis, the state-sample networks are not equivalent to, and cannot provide the same results as data-domain sampled networks.

Prior art systems suffer at two extremes. If transformations are relied upon, information is lost in the transformation. If all information is maintained, then the complexity of calculation becomes inordinate, perhaps impossible, and typically too burdensome to be useful in many applications. In state-sampled networks, linearity provides transformations without losing information that is critical to a solution.

By contrast, in an apparatus and method in accordance with the invention, multidimensional sampling theory may be useful, but selection of a number of samples that represent a dynamic page of inputs may require evaluation of data in the data-domain, not in some easily tractable state space. On the other hand, mapping a finite number of points specified can provide some simplicity of calculation.

According to the invention, points may be specified by their data performance or behaviors, such as the frequency or rates of changes in functional values in the data-domain. Thus, generation of output variables, or determination of dependent variable values and correlation of those dependent variables with independent variables in the data need not be linear or non-linear functions. Instead, points may be specified according to some optimized grid or increment, which may be linear or non-linear also.

The instant invention relies on the techniques of image processing, preserving the multidimensional image, rather than classical digital signal processing, which is typically a single uncoupled dimension of data measured along a time stream. Rather, the instant invention may provide methods and apparatus for managing multidimensional sampling of coupled data, using multidimensional sampling theory. Functional relationships may be stored in the multi-variable domains.

By contrast, the prior art will typically rely on a single channel at a time and assume independence, thus losing information in the dependence between channels. Similarly, prior art systems typically transform channel information so that complex logarithmic trigonometric or other transforming, approximation equations are required. The complexity introduced by such transforms often makes calculation intractable. By contrast, the instant invention provides for processing multiple channels together without any presumption of linear addition or of independence uncoupling.

In the prior art, inputs were state variables of the same type as outputs. That is, dependent and independent variables in a space were of the same type. The invention of the instant application provides a data can be of any arbitrary type, and the dimensions of the data-domain may include time, space, or any other parameter that may have even been considered unrelatable for reasons of non-linearity or other complex relationships. An apparatus and method in accordance with the invention may rely on a simple matching of point-by-point data over a native data-domain, determining the output at each point. Multidimensional sampling theory may provide some definition of the minimum number of points that will contain all the information in an interpolation or in a data sample. Thus, each dimension in a data-domain may have its own required number of sampling points in order to keep all information.

For example, if a surface in a data-domain is comparatively linear in one dimension, any two points will define the variation in that dimension. By contrast, an undulating surface may require multiple degrees of a polynomial or other non-linear coupling, and thus multiple points in order to define the surface in that more complex dimension.

Thus, the individual dimensions may have their own individual numbers of sampling points. Accordingly, the number of data points required, and number of variables in an interpolation function may be both be optimized even without knowing the nature of the relating function between dependent and independent variables. The data-domain information is itself relied upon to maintain a well-behaved, even optimize a set of data in a data-domain sampled network, and corresponding interpolation functions and therefor.

Interpolating typically relies on an interpolation function comprising certain terms and a table of weights. In certain embodiments, the number of weights may be limited according to multidimensional sampling theory in order to optimize (minimize) the number of weights or data points required, while also optimizing (maximizing) the precision of the correlation or fit of an interpolation function to data points.

A table of weights may be prepared to reflect a matrix of coefficients. The matrix represents variables of matrix equations. The matrix equations may represent various terms combining dependent variables, independent variables, or both in linear or non-linear arrangements.

Referring to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a readonly memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telephone line 39, may be used for communication with other devices, users, or the like. Similarly, a scanner 40 may be used to receive graphical inputs which may or may not be translated to other character formats. A memory device 41 of any type (e.g. hard drive, floppy, etc.) may be used as an input device, whether resident within the node 11 or some other node 52 on the network 30, or from another network 50.

Output devices 24 may likewise include one or more physical hardware units. For example, in general, the port 28 may be used to accept inputs and send outputs from the node 11. A monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. In general, herein, any node 11, 52 accessible to obtain information or files may be referred to as a server. Thus, a "web site" available to users of an internetwork 50 may be thought of as a server 54, serving whatever it serves. Other special functions, including communications, applications, directory services, and the like may be implemented by an individual server 54 or multiple servers 54. An node 11, 52 may be a server 54.

In general, a node 11 may need to communicate over a network 30 with a server 54, a router 48, or other nodes 52. Similarly, a node 11 may need to communicate over another network (e.g. like or unlike the network 30) in an internetwork 50 connecting with nodes 52 remote from the network 30. Likewise, individual components 12–46 may need to communicate data with one another. A communication link may exist, in general, between any pair of devices.

Figure 2:
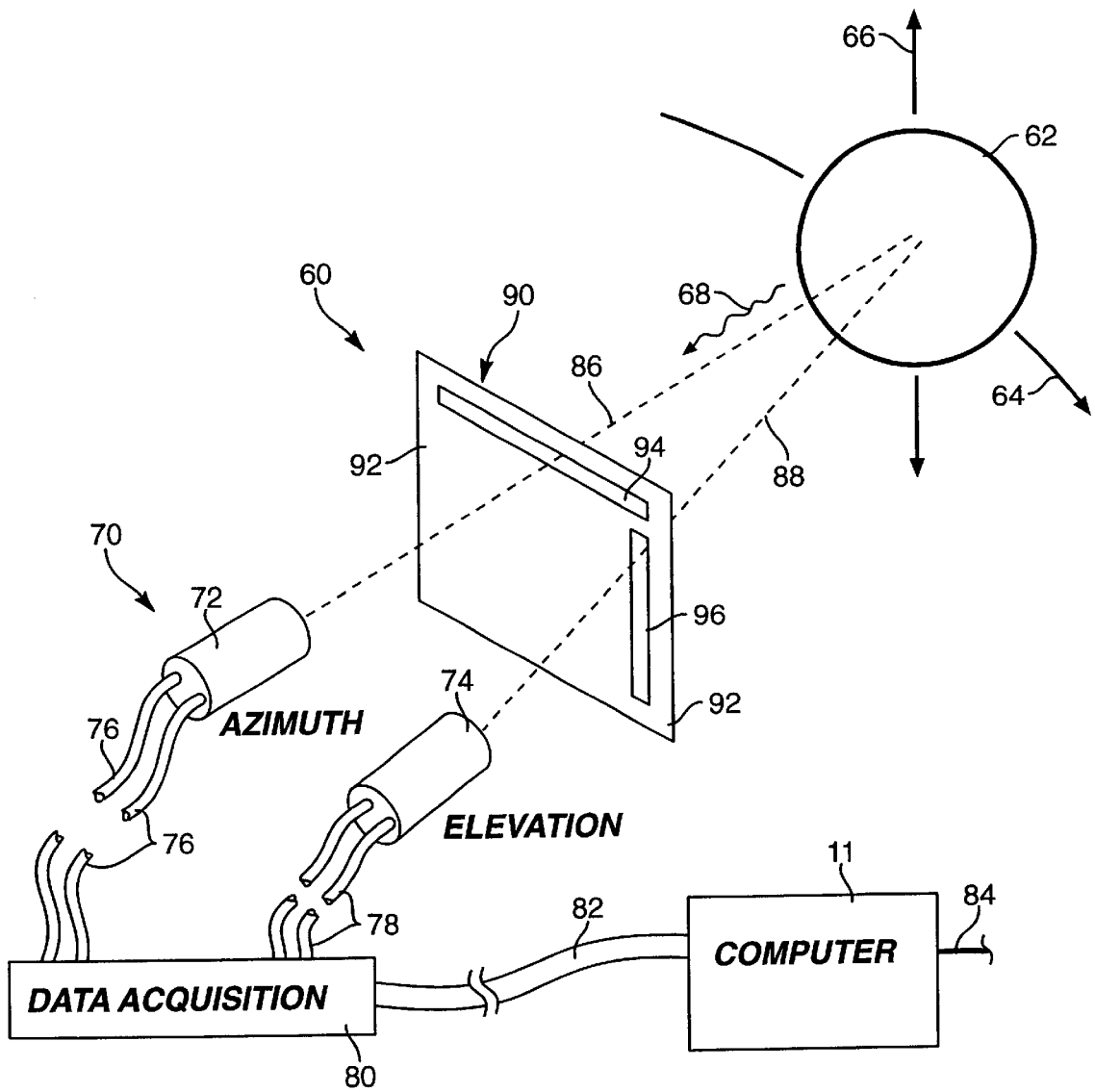
FIG. 2 is a schematic diagram of a sensor system illustrating coupled data generation for a data domain sample network.

Referring to FIG. 2, a system 60 for observing an object 62 moving in an azimuthal direction 64 and an elevation direction 66 is illustrated. In the illustration of FIG. 2, radiation 68 (an image) proceeds from the object 62, which may, for example, be the sun 62. In the illustrated embodiment, a sensor suite 70 includes detectors 72 (azimuthal sensor 72) and 74 (elevation sensor 74) that detect radiation (images) reflecting motion in dimensions orthogonal to one another.

The sensors 72, 74 have connections 76, 78 or connecting data lines 76, 78 for connecting the sensors 72, 74, respectively, to a data acquisition system 80. The data acquisition system 80 may execute digital signal processing or other pre-processing. Alternatively, the data acquisition system 80 may simply record parameters output by each sensor 72, 74.

In turn, the data acquisition system 80 may connect to an external computer 11 by a cable 82 or other connection 82. The connection 82 may provide both data from the data acquisition system 80 to the computer 11, and controlling data to the data acquisition system 80 from the computer 11.

In general, the computer 11 may be connected to a network 84 in order to provide raw data, pre-processed data, or completely analyzed data from the data acquisition system 80 to other nodes on the network 84. As a practical matter, with networks proliferating, the network 84 may be a local area network or an internetwork and may provide input signals to the computer 11 for controlling the data acquisition system 80, or may simply be a user of data, provided by the computer 11 and representing or reflecting the data from the data acquisition system 80.

Each of the sensors 72, 74 has a "line" of sight 86, 88 toward the object 62. In the illustrated embodiment, an aperture system 90 provides a mask 92, an azimuthal aperture 94, and an elevation aperture 96, in order to isolate the data reflecting motion of the object 62 in the azimuthal 64 and the elevation direction 66. Nevertheless, as a practical matter, motion of the object 62 in any direction 64, 66 effects the radiation 68 passing through the respective aperture 94, 96 to be ultimately received by the respective sensor 72, 74. As a result, the data recorded by the data acquisition system 80 for each of the sensors 72, 74 is actually coupled. In fact, all motions of the object 62 affect the radiation 68 detected by both sensors 72, 74. The example of FIG. 2 is merely a simplified example in two dimensions. In general, a system of any number of dimensions may exist.

In a method and apparatus in accordance with the invention, the data provided by the sensors 72, 74 to the data acquisition system 80 need not lose the information stored in the coupling relationship. Mathematically, partial differential equations exist to describe phenomena in which variables or dimensions in a space of interest are not independent.

To the extent that data received on multiple channels of a data acquisition system 80 is independent, then information will not be lost by assuming a lack of coupling or an independence between the channels. However, in the example of FIG. 2, assuming that data recorded by the two sensors 72, 74 in the data acquisition system 80 is separable by channels is an incorrect assumption. Storing and analyzing the data by individual channels or uncoupled transformations and assuming independence will destroy the coupling information.

Accordingly, no assumption of linearity or independence is required with respect to data. Instead, the data is maintained in its native domain 100 (see FIG. 3). By maintaining data in its native domain 100, distortions or singularities, discontinuities, and the like, need not be introduced by transformations. Instead, the data can be recorded coupled as detected, and an apparatus 10 in accordance with the invention can process the data to determine the correlation between all variables or dimensions in the data domain 100.

In speaking of a data domain 100, one may think of independent and dependent variables naturally. However, in many situations, independence and dependence of variables is not understood or even recognized. Thus, one advantage of an apparatus and method in accordance with the invention is an ability to preserve the information that may be otherwise detectable in the coupling between channels in a data acquisition system 80.

Figure 3:
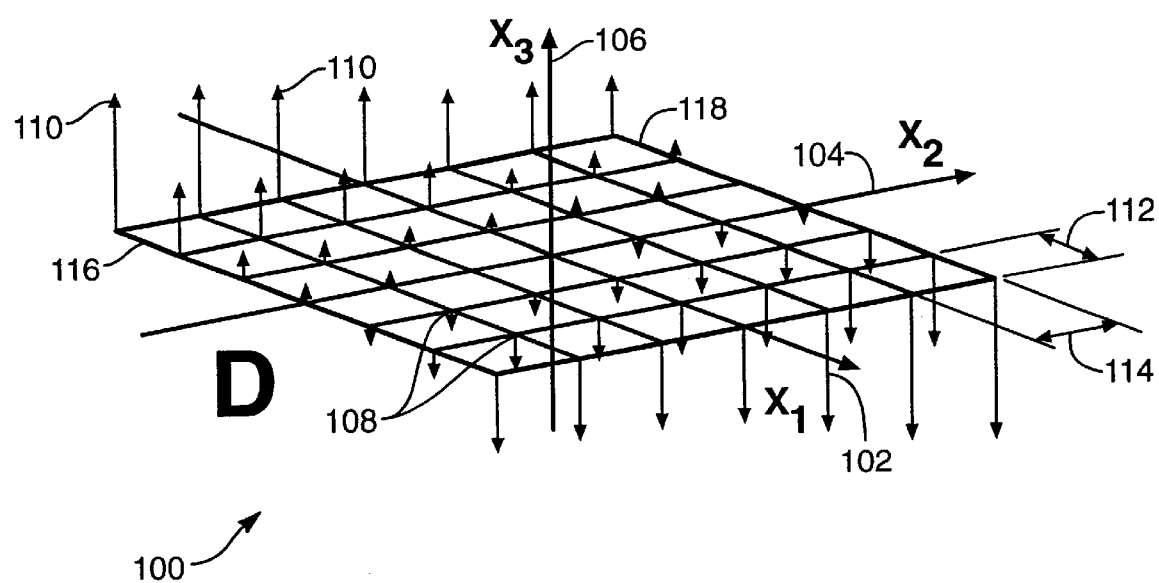
FIG. 3 is a schematic diagram of a data domain.

Referring to FIG. 3, a data domain 100 may be defined in terms of a first variable 102 or first dimension 102, a second variable 104 or second dimension 104, and a third variable 106 or third dimension 106. Since more than three dimensions are very difficult or impossible to illustrate, the example of FIG. 3 relies on three dimension. Nevertheless, no inherent limit exists on the number of dimensions in a data domain 100.

The data domain 100 includes various points 108 in a surface defined by the first 102 and second dimension 104. Corresponding to each point 108, is a value 110 in the dimension 106. One may naturally desire to think of the first and second dimensions 102, 104 as the independent dimensions, and the dimension 106 of the values 110 as a third and dependent dimension.

Nevertheless, in accordance with the invention, any dimension 102, 104, 106 may be selected as a functional or valued dimension, sometimes referred to as a solution dimension or a function of interest 110. No presumptions need to be made regarding what is dependent and what is independent in storing data. Anything that can be detected and recorded may be stored in a data domain 100. Any practical number of dimensions 102, 104, 106 may be used. Thus, any practical number of variables 102, 104, 106 may be used in the data domain 100.

Also, although used in the illustration, the increments 112, 114 may be regular, irregular, and may or may not be known in advance. For example, when a data acquisition system 80 records data, the data 100 typically is a stream in time. Thus, for every channel of a data acquisition system 80, some series of points 108, 110 is recorded, one value for each channel at the time common to all channels in the data stream. Later, in processing, such as for examination or analysis purposes, and the like, various sub-domains 116, 118 may be defined. Those sub-domains 116, 118 may be defined in terms of increments 112, 114 within the respective dimensions 102, 104.

Figure 4:
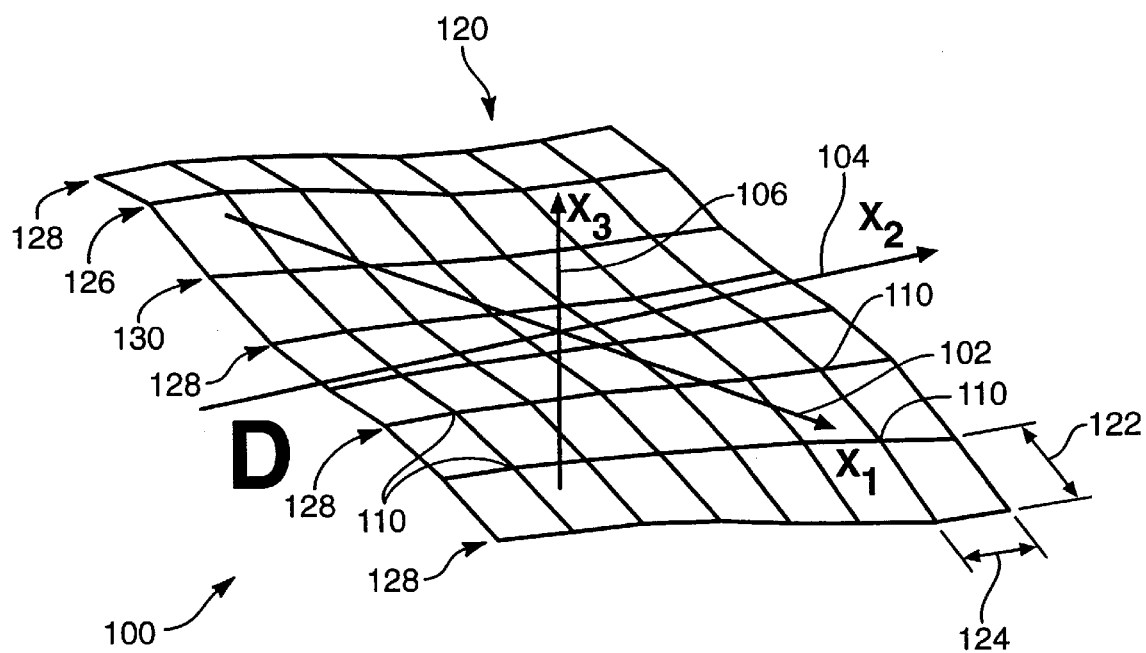
FIG. 4 is a schematic diagram of a data domain illustrating a surface representing one parameter or value set within the data domain of FIG. 3.

Referring to FIG. 4, the data domain 100 of FIG. 3 may be viewed to include a surface 120 connecting the values 110 in the dimension 106 or functional dimension 106. It is important to note that the functional dimension 106 is an arbitrary designation. As a practical matter, the functional dimension 106 may be a dimension suggested by ease of controlling other variables 102, 104. However, no preconceived notions need to be entertained regarding dependence and independence of variables 102, 104, 106 except here as required for clarification in the example.

The surface 120 may extend in all the dimensions 102, 104, 106. A surface dimension 122 is not the same as a dimension 102. Likewise, the surface dimension 124 is not the same as the dimension 104. Rather, the dimensions 122, 124 are dimensions along the surface 120, which surface 120 may be projected in the data domain 100 onto the surface defined by the directions 102, 104, or dimensions 102, 104.

In analyzing the surface 120 in the data domain 100, one may note local maxima 126 and local minima 128. Necessarily, between every maximum 126 and minimum 128, an inflection point exists. In determining the precision required, according to sampling theory, in order to accurately represent the data domain 100, an evaluation of the numbers of inflection regions 130 determines the required number of sampling points and the degree or other functional parameters required for any interpolation function.

Figure 5:
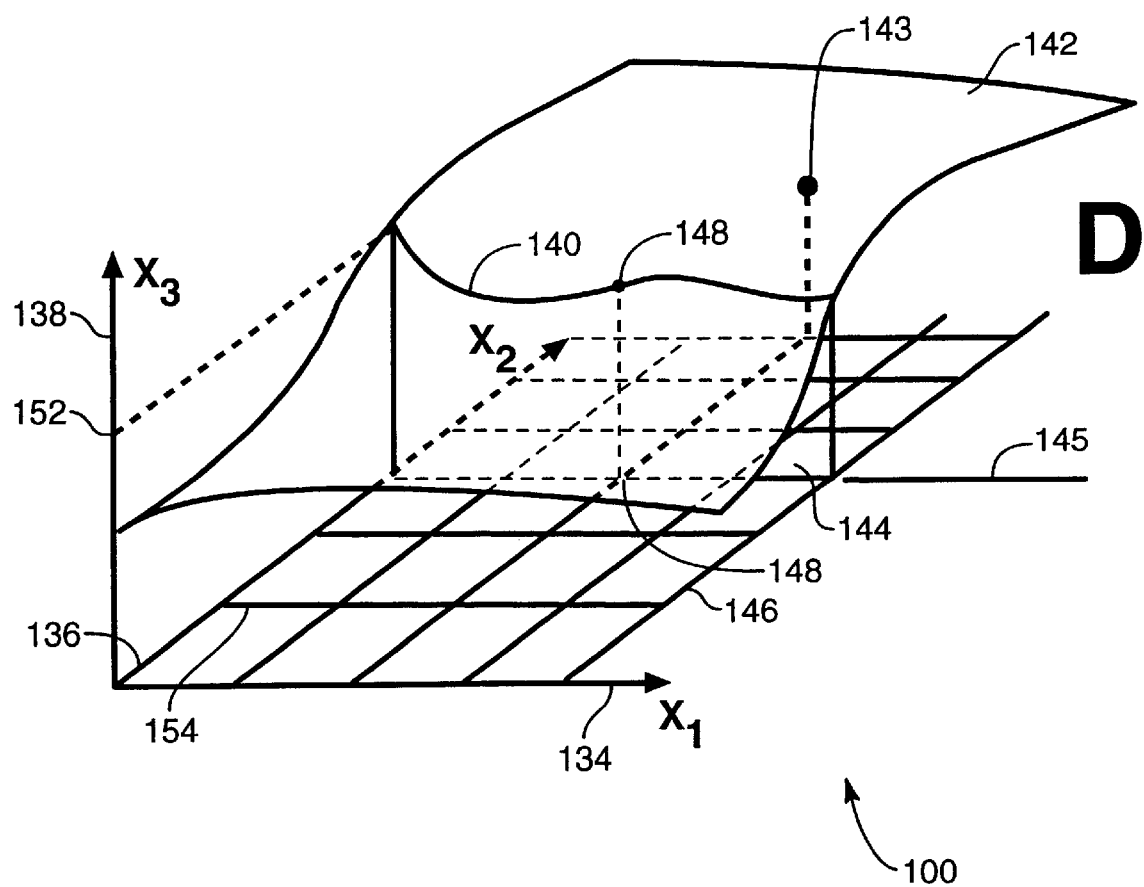
FIG. 5 illustrates curves of intersection at constant values of a variable or dimension in a data domain.

Referring to FIG. 5, a first dimension 134 and second dimension 136 correlate to a third dimension 138 and to one another. In FIG. 5, a curve 140 of intersection between a surface 142 represents values in the third dimension 138 at any value of the first and second dimension 134, 136.

A plane 144 of constant dimension 136 corresponds to a fixed value 145 in the second dimension 136. The intersection curve 140 of the plane 144 with the surface 142 represents a curve 140 in the data domain 100 at a constant value 145 of the variable 136 or dimension 136.

Nevertheless, the presence of the plane 144, or the fact that the plane 144 may exist, does not necessarily mean that the plane 144 may be defined. That is, all the variables 134, 136, 138 may be interdependent. A change in any of the variables 134, 136, 138 may alter the structure of the surface 142. In many real problems encountered in the world, involving actual data from physical systems, defining the surface 142 or the curve 140 can be impossible without recourse to numerical approximation schemes.

Tremendous computing power may be required. Tremendous complexity may exist in the relationships. In accordance with the invention, an apparatus and method may define the relationships between the surface 142 and the variables 134, 136 without resort to transformations, assumptions, independence or decoupling, and without highly sophisticated and time-consuming calculations.

The distance 146 may be thought of as a value 146 in the dimension 136. The plane 144 may be thought of as a series of points, of which the point 148 happens to exist in both the plane 144 and the surface 142. The value 150 represents a similar value 138 corresponding to a value of the variable 134 or dimension 134 of zero and a value 152 of the dimension 138, at a value 146 of the variable 136.

For convenience, a grid 154 may define a sub-domain of the data domain 100. The grid 154 may be arbitrary or equally incremented. In accordance with the invention, time, the one variable or dimension whose regularity can usually be controlled, cannot actually be controlled at all. Rather, the variable time is simply incremented, and a data acquisition system 80 is controlled to record channels at a certain specified increment of time. Nevertheless, time cannot actually be controlled. Thus, a data domain may actually contain one or no single, regularly incremented dimension, such as time. All other dimensions may vary with the range of the values of parameters measured in those dimensions.

Nevertheless, in other systems, several parameters in the data-domain may be provided or controlled as inputs. A method and apparatus in accordance with the invention vary drastically from typical state-sampled control networks requiring transformation, and usually implementing state-domain incrementation in some regular fashion. Control of the data in the instant invention is not required.

Figure 6:
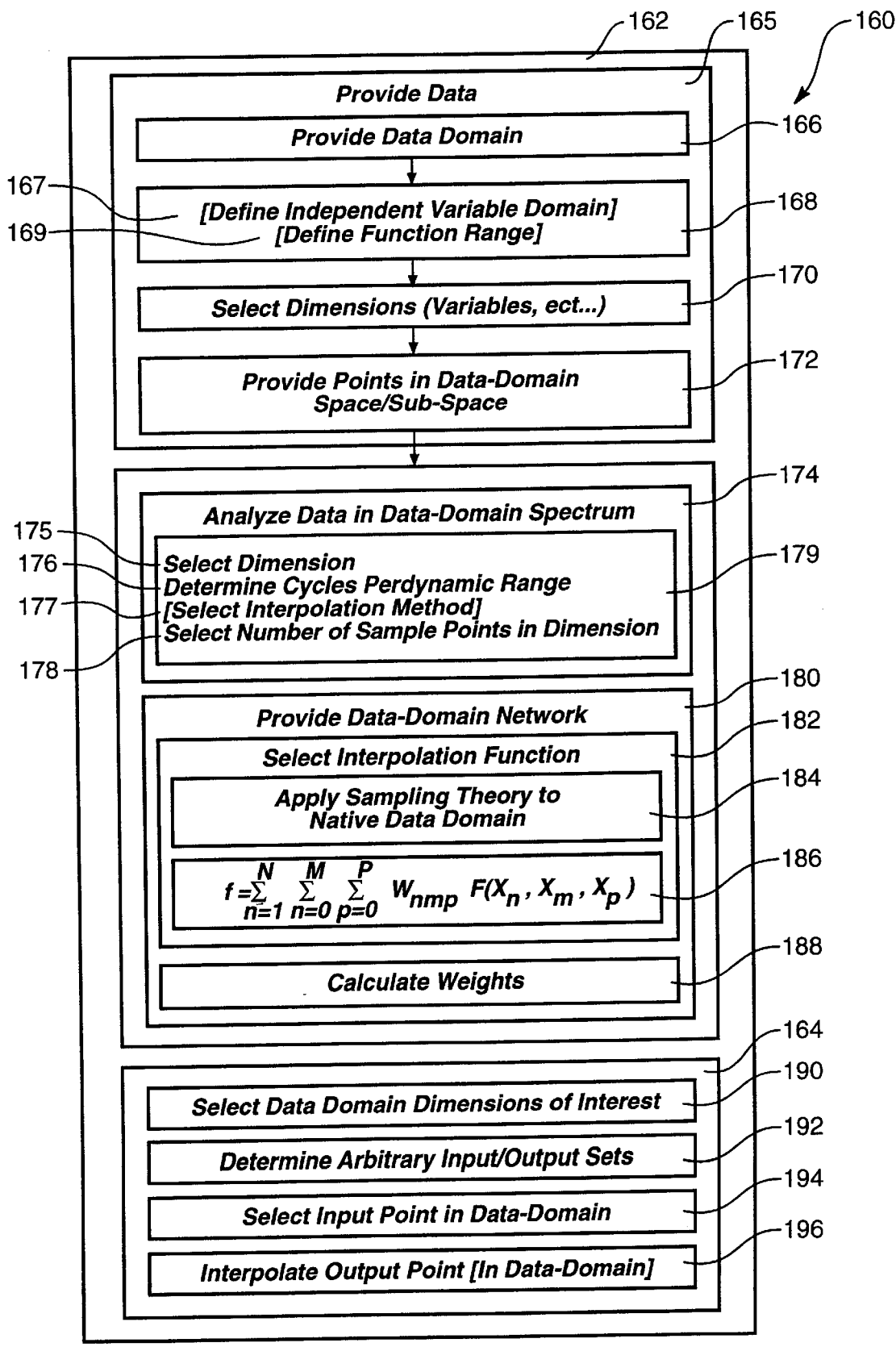
FIG. 6 illustrates a schematic block diagram of a process for creating and using a data domain sample network.

Referring to FIG. 6, a process 160 or method 160 for creating 162 and using 164 a data-domain sampled network is illustrated. Initially, creating 162 a data-domain sampled network, may include providing 165, and optionally defining 166 a data domain 100. A data domain 100 is defined by the dimensions 134, 136, 138, which need not be limited other than to the number of variables or dimensions in which data can be recorded. These may include a definition of the units or properties as well as values in each dimension. A defining step 168 may include optional steps 167, 169. The brackets in the labels indicate that certain processes are optional, although other process steps may also be deleted in selected embodiments.

The defining step 167 is responsible for defining an independent variable domain. The defining step 169 is responsible for defining the functional range. The concepts of domain and range, as well as the concepts of independent variable (input) and dependent variable (output or function) may range from somewhat arbitrary to absolutely and completely arbitrary. Nevertheless, defining 169 a function range typically involves determining a parameter or dimension 138 or interest in which a surface 142 of interest is desired to be observed, not necessarily controlled.

By contrast, defining 167 an independent variable domain, involves selecting other dimensions 134, 136, the influence of which is desired to be parameterized or otherwise quantified or qualified to determine how it relates to or affects the values of the surface 142 or the points 148, 150 within the surface 142 over the dimensions 134, 136.

Thus, the defining step 168 is regarded as optional. Since relationships are inherent in the data domain 166. Those relationships are preserved, and have not been destroyed by manipulation, transformation, and the like, as in prior art systems.

Selecting 170 the dimensions or variables for analysis is responsible for determining which dimensions of the data domain 100 will be relied upon. Providing 172 points in the data-domain space 100, or a sub-space 100, is providing the data of interest, whether dependent, independent, or of unknown relation.

Analyzing 174 data in the data-domain spectrum may include selecting 175 an individual dimension, for evaluation. Thus, the steps 175, 176, 177, 138 may be repeated for each dimension in the data-domain space 100 or data domain 100. Determining 176 the cycles for dynamic range may include evaluating a surface 120, 142 for inflections 130. In general, the frequency, rates of change, number of maxima 126 and minima 128, and so forth will influence the number of data points 148 required in a minimum sample size, as well as influencing the complexity of any interpolation scheme.

Selecting 177 an interpolation method is optional. Sampling theory and interpolation theory have developed optimized techniques. Selecting 177 an interpolation method may be desirable in order to obtain access to an optimized interpolation method and function. This may be helpful for a particular determination 176 of cycles per dynamic range in the dimension 134, 136, 138 of interest.

Selecting 178 a number of sample points in the dimension 134 of interest (the dimension 134 of interest will be used to indicate any dimension 134, 136, etc. in a space 100) is a direct function of the determining step 176. The process 179 continues from the beginning selecting step 175 for all dimensions 134 of interest, including any dimensions 106, 138 of functional surfaces 120, 142, and the like.

Providing 180 a data-domain network, or, more properly data-domain sampled network 180, may begin by selecting 182 an interpolation function. Applying 184 sampling theory to the native data domain 100, or the data domain 100, may suggest types of interpolation functions, as well as an optimal interpolation function of any particular type. For example, the division of sine (x)/x is called a sinc function, and may provide one form of a suitable, even optimized, interpolation function. An interpolation function may be something like the interpolation function 186 of the example of FIG. 6. In the example of FIG. 6, the interpolation function 186 relates a function to a series of summations of a waiting function multiplied by a value of a function or data point in a particular dimension 134 in a data-domain 100.

Again, the functionality may be somewhat arbitrary, since the correlation between functions in various dimensions 134, 136, 138, or values in various dimensions 134 (dimensions generally 134) is the important factor, and is not presupposed. Details of how to use interpolation functions, may be gleaned from documentation known in the art, and need not be bound to a particular solution in the present invention. Nevertheless, the interpolation function 186 has been found suitable.

Calculating 188 the weights 208 (see FIG. 7), represented by the "W" of the interpolation function 186 may be done by any method known in the art. Nevertheless, the reference already cited above contains suitable methods for calculating 188 the weights.

Using 164 a data-domain sampled network 218 (see FIG. 9), may include selecting 190 the data-domain dimensions 134 of interest. Selections may be made without regard to what variables 134 or dimension 134 are independent from which other dimensions 134 e.g., 136, 138, etc.). Selecting 190 may involve merely determining which parameters, and which parameters' influence thereon are desired to be viewed. In general, one may even select some figure of merit having some functional relationship to parameters, and observe the change in the figure merit as one of the values 106 in a data-domain 100.

Determining 192 arbitrary input and output sets is related to selecting 190 the dimensions 134 of interest. In general, input and output have meaning in experiment design. Nevertheless, in an apparatus or method in accordance with the invention, behaviors and relationships need not be controlled, transformed, manipulated, etc. as a requirement for finding a solution. Thus, an individual may actually select arbitrary sets of dimensions 134 to be included in a selection from a data domain 100. Nevertheless, in order to obtain the maximum information, all dimensions 134 (recall 134 may represent any and all dimensions) may be used and certain dimensions 134 may be selected for observation as output sets. Likewise, certain dimensions 134 may be put into an input set, and plotted or evaluated at some regular increment for purposes of clearer observation of an output set.

Thereafter, selecting 194 an input point in the data domain 100 is a repetitive process. Selecting 194 any input point in the data domain 100 provides a point in the data-domain at which a value 106 of an interpolation function 186 may provide a corresponding "solution" for the point of interest.

Interpolating 196 an output point, implies calculating an interpolated value 110 corresponding to a point 108 in selected dimensions 102, 104 of a data domain 100. If some equation is available, figure of merit is relied upon, one may find a function value 110 outside of the data domain 100. However, knowledge of functional relationships between the data domain 100 and the other parameters is not required. In general, all inputs and outputs of interest may be considered to be part (dimensions) of the data-domain. Thus, typically, all values found during the interpolating step 196 are typically within the range limits of the data domain. Likewise, interpolating step 196 finds values of dimensions 134 within the data domain 100.

Figure 7:
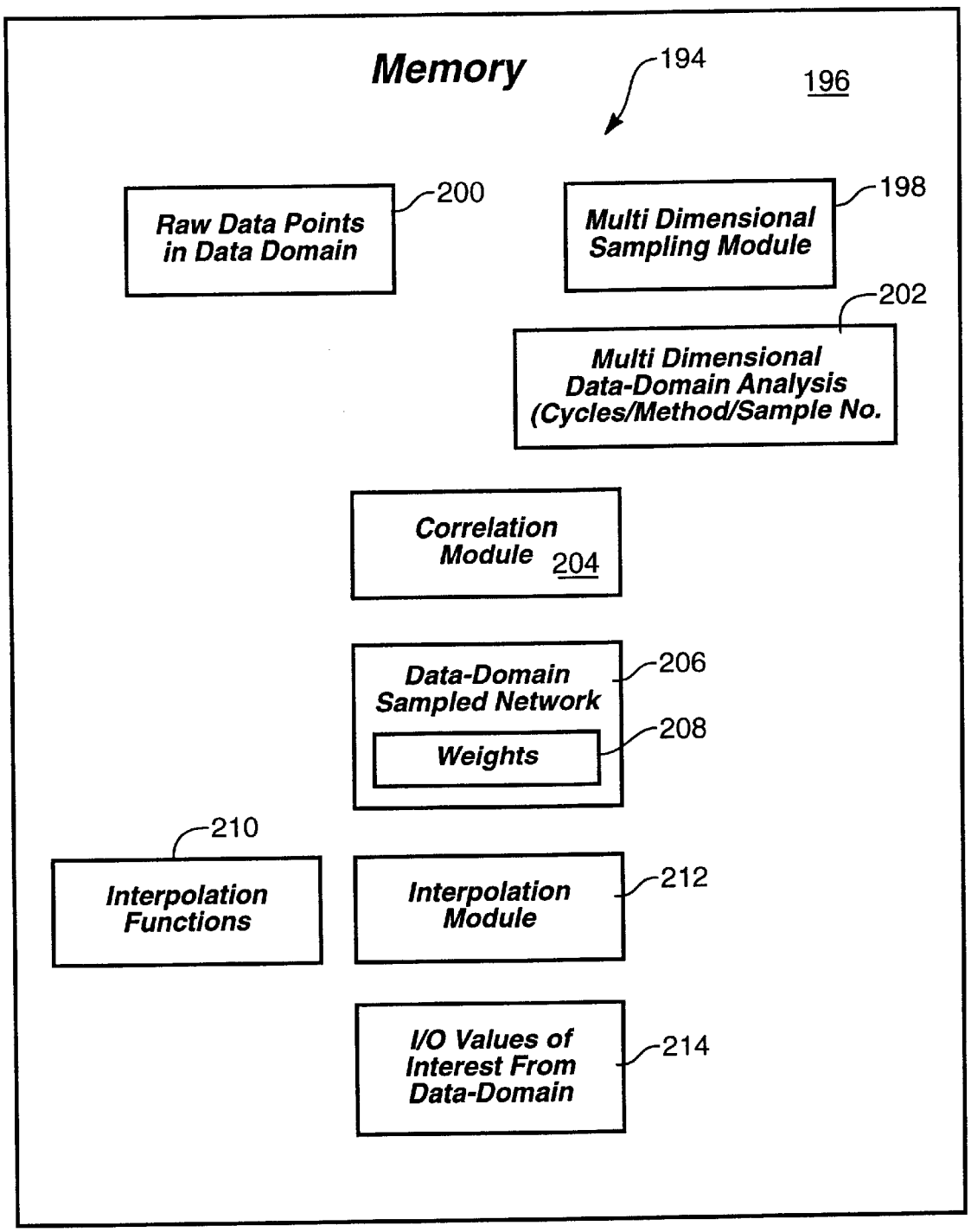
FIG. 7 is a schematic block diagram of data structures for implementing the invention in a memory of a computer.

Referring to FIG. 7, executable and operational data in accordance with the invention is illustrated. In general, a computer readable memory device 196 corresponding to a computer 11, may store various data structures 200–214. As a practical matter, a multidimensional sampling module 198 may be responsible to embody sampling theory in order to provide the analysis for data in the data-domain 100 spectrum as discussed with respect to FIG. 6.

Thus, the multidimensional data-domain analysis output 202 including the frequencies, cycles, interpolation method selections, and selection of the number of required samples in each dimension, and the like, as determined by sampling theory, may be provided as an output of the multidimensional sampling module 198.

A correlation module 204 may be responsible to use outputs from the multidimensional data-domain analysis 202, as well as the raw data points 200 stored in the memory 196 in order to provide the weights 208 or weight calculations 188.

The data-domain sampled network 206 and, in particular, the weights 208 reflect the information obtained from the raw data points 200 in the data domain 100. The interpolation module 212 relies on the weights 208 of the data-domain sampled network 206, and the data points 200 from the data domain 100, and the interpolation functions 210 in order to provide values of interest 214 from the data domain 100.

The selection of input versus output is an arbitrary choice within the context of the data domain 100, as described. Thus, the input or output values 214 of interest, are from the data domain, but are typically not at values of actual raw data 200, since interpolation functions 210 provide for all intermediate points in a surface 120, 142 in the data domain 100.

Figure 8:
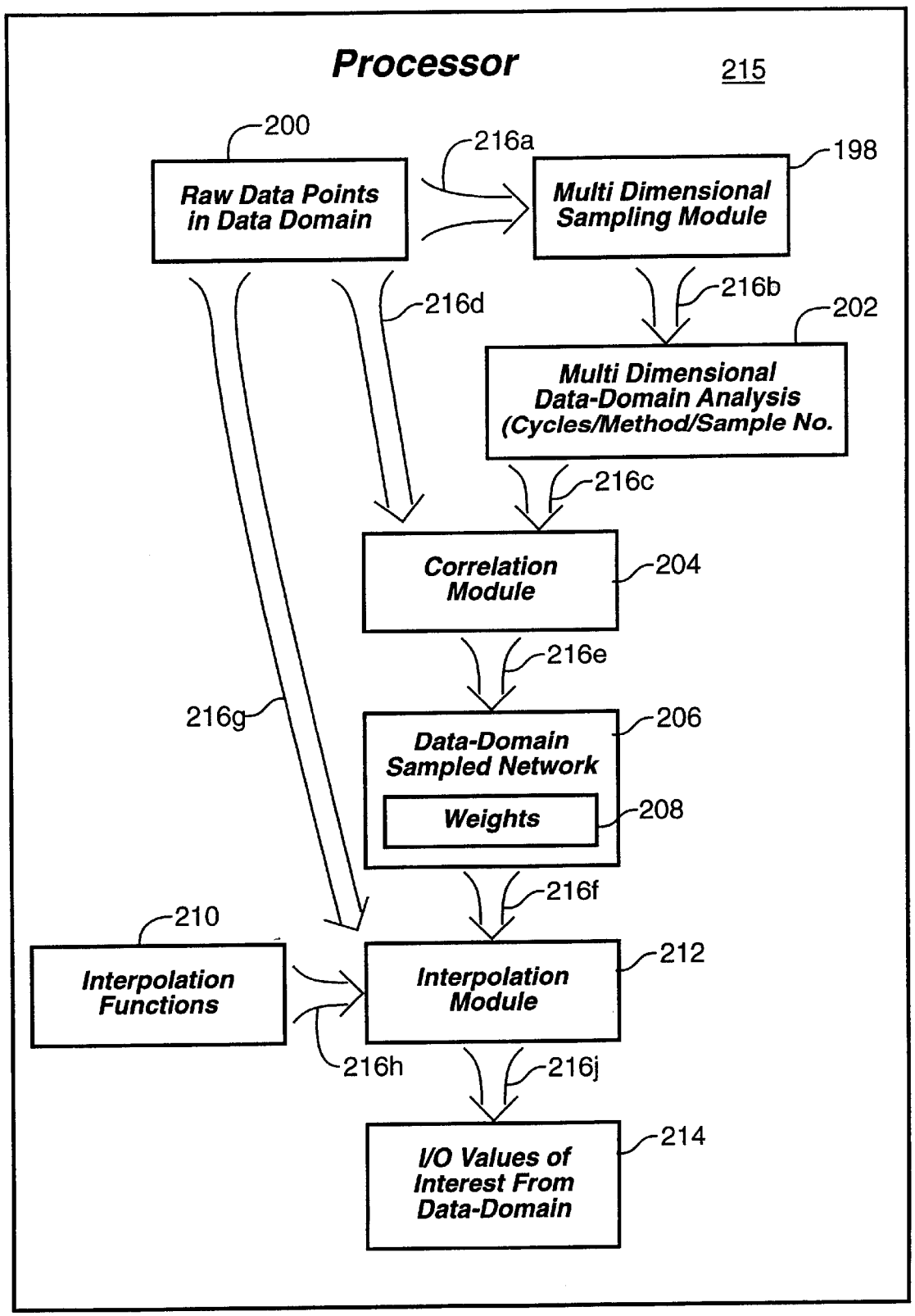
FIG. 8 is a schematic block diagram of the processes and data structures for implementing the apparatus and method of FIGS. 1–7.

Referring to FIG. 8, while still continuing to refer to FIG. 7, the data structures 194 in the memory device 196 may be executed in a processor 215, such as the processor 12 in the computer 11. The raw data points 200 are provided 216a or processed 216a (216 is generic, 216a–216h are specific) by the multidimensional sampling module 198 in order to provide the multidimensional data-domain analysis 202, an output 202. Thus, cycle numbers, methods of interpolation, and the number of required samples for optimization may all be provided as part of the multidimensional data-domain analysis 202 or output 202.

A correlation module 204 may be employed, and may use any suitable mechanism for correlating the data points 200. A significant advance of the invention over prior art systems s is the fact that the correlation module 204 relies only upon the data 200. The multidimensional data-domain analysis 202 is provided based on the data domain 100 and data 200 only, not on transformations, a priori information, hypothesized or analyzed equations, uncoupled channels, or the like. Thus, up through the processes 216c, 216d of the correlation module 204, of data 200 and the analysis output 202, the data domain has been relied upon exclusively, without transformations into other domains.

The data-domain sampled network 206 comes as a direct result 216e of the correlation module 204. The resulting weights 208 characterize the data-domain sampled network 206. Accordingly, the weights 208 along with the data 200 is provided 216f to the interpolation module 212 along with the interpolation functions 210 provided 216h to the interpolation module 212. The interpolation module 212 executes the interpolation in accordance with interpolation functions 210 provided, relying on the data 200 and the weights 208 provided. The output of the interpolation module 212 is a value 214 of interest, within the data domain 100, for any point 226 (see FIG. 9) anywhere in the data domain 100.

Figure 9:
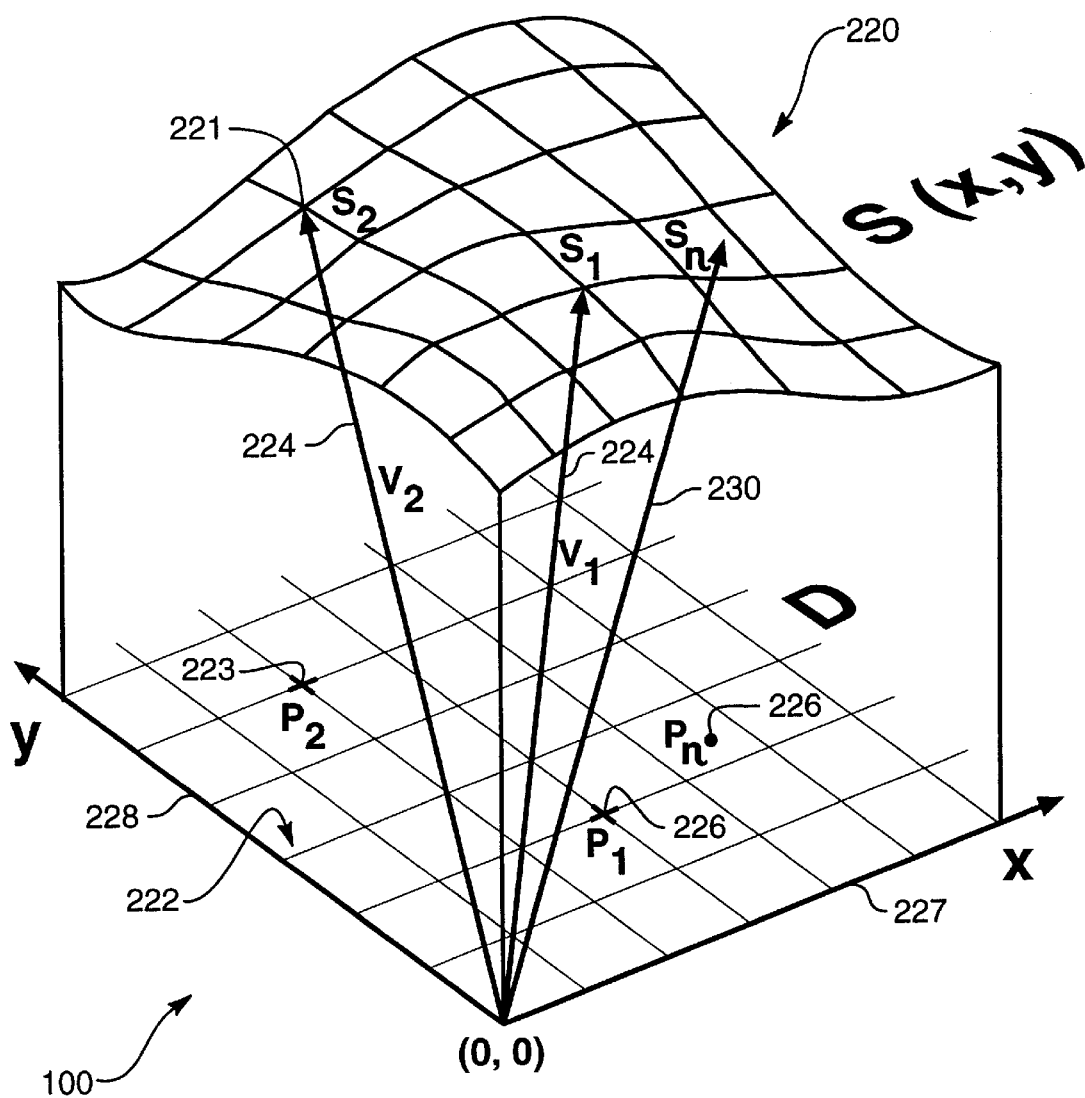
FIG. 9 is a schematic representation of interpolation of a point on a surface of interest in a data domain of interest according the method and apparatus of the invention.

Referring to FIG. 9, the data domain 100 may be viewed as a complete and continuous space. Due to the interpolation module 212, points 110 or values 110 may be defined continuously anywhere within the domain 100, providing a surface 220. The surface 220 is made up of points 221 (e.g., values 110) defined by vectors 224. In general, one may think of the surface 220 as a solution 220 or dependent surface 220 while considering a sub-domain 222 as an independent space 222.

Accordingly, the vectors 224 correspond to points 221 or values 221 mapped throughout the sub-domain 222 of the data-domain 100. That is, the data-domain 100 includes both the surface 220, and the sub-domain 222. Again, the sub-domain 222 and surface 220 may be thought of as respective, arbitrary input and output (e.g. independent and dependent) selections. The surface 220 is a representation of a parameter of interest in the data domain 100 desired to be observed.

Due to the interpolation function 210 and the weights 208, a point 226 that is not included in the original data points 223, but existing within the data domain 100, has a vector 230, the value 232 of which is a point 232 on the surface 220, provided as an output by the interpolation module 212.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for processing sensor data to obtain a value of interest from desired input values originating at multiple sensors, the method comprising:
   providing a data domain having a first dimension corresponding to a first sensor, a second dimension corresponding to a second sensor, and a third dimension corresponding to values of interest;
   sampling data from the first and second sensors to obtain input values in the data domain;
   creating a data-domain sampled network comprising a correlation of values of interest with the input values within the data domain by applying a multidimensional sampling theory having a weighting function, the weighting function providing simultaneous correlation between the values of interest and the input values from the first sensor and the second sensor; and
   determining a correlating value of the values of interest, the correlating value correlating to the desired input values, based on the correlation within the data domain, the correlating value being the desired value of interest.

2. The method of claim 1, wherein the first and second sensors are configured to measure attributes of a single object.

3. The method of claim 1, further comprising:
   providing a computer readable memory containing operational and executable data structures, the data structures comprising:
      a multidimensional sampling module, executable to analyze, within the data domain, the data to determine a sampling architecture; and
      a correlation module, executable to process the data and the sampling architecture to correlate the data and provide the data-domain sampled network.

4. The method of claim 3, further comprising providing an interpolation module for interpolating the correlating value from the desired input values.

5. The method of claim 1, further comprising providing an interpolation function developed using the input values and values of interest in the data domain.

6. The method of claim 5, further comprising providing an interpolation module for interpolating the correlating value correlating to the desired input values.

7. The method of claim 6, wherein the interpolating relies on an optimal interpolation function, determined in accordance with the multidimensional sampling theory and by analysis, in the data domain, of the input values and values of interest.

8. The method of claim 1, further comprising providing the data-domain sampled network, defined by a set of weights reflecting an analysis of untransformed data represented by the input values in the data domain.

9. The method of claim 1, wherein creating the data-domain sampled network is accomplished without mathematical manipulation of the input values.

10. An article comprising a computer readable memory containing operational and executable data structures for processing sensor data, the data structures comprising:
   a data domain having a first dimension corresponding to a first sensor, a second dimension corresponding to a second sensor, and a third dimension corresponding to values of interest, the data domain containing data including input values from the first and second sensors;
   a correlation module, executable to create a data-domain sampled network comprising a correlation of values of interest with the input values within the data domain by applying a multidimensional sampling theory having a weighting function, the weighting function providing simultaneous correlation between the values of interest and the input values from the first sensor and the second sensor; and an interpolation module for interpolating a correlating value of the values of interest from desired input values.

11. The article of claim 10, further comprising an interpolation function developed using the data in the data domain and implemented by the interpolation module for interpolating values in the first dimension.

12. The article of claim 11, wherein the interpolation is an optimal interpolation function.

13. The article of claim 12, wherein the optimal interpolation function is determined in accordance with the sampling theory and by an analysis, in the data domain, of the data.

14. The article of claim 13, wherein the data-domain sampled network is defined by a set of weights reflecting an analysis of untransformed data represented by the data in the data domain.

15. The article of claim 13 wherein the simultaneous correlation reflects coupling between the input values from the first sensor and the second sensor.

16. The article of claim 15, wherein the first and second sensors are configured to measure attributes of a single object.

17. An apparatus for processing sensor data, the apparatus comprising:

a processor;

a memory device, computer readable and operably connected to the processor for storing operational and executable data structures, the data structures comprising:

input values stored in first and second dimensions of a data domain, the first and second dimensions corresponding to first and second sensors respectively;

a correlation module, executable to create a data-domain sampled network comprising a correlation of values of interest with the input values within the data domain by applying a multidimensional sampling theory having a weighting function, the weighting function providing simultaneous correlation between the values of interest and the input values from the first sensor and the second sensor; and an interpolation module for interpolating a correlating value of the values of interest from desired input values.

18. The apparatus of claim 17, wherein the desired input values correspond to attributes of a single object.

19. The apparatus of claim 17, further comprising an interpolation function corresponding to the simultaneous correlation and provided without mathematical manipulation of the input values.

20. The apparatus of claim 19, wherein the data-domain sampled network further comprises weights derived through operation of the weighting function.

* * * * *